United States Patent
Sankruthi

(10) Patent No.: US 10,318,742 B1
(45) Date of Patent: Jun. 11, 2019

(54) SYSTEMS AND METHODS FOR EVALUATING SECURITY SOFTWARE CONFIGURATIONS

(71) Applicant: Symantec Corporation, Mountain View, CA (US)

(72) Inventor: Anand Sankruthi, K.K. Nagar (IN)

(73) Assignee: Symantec Corporation, Mountain View, CA (US)

( * ) Notice: Subject to any disclaimer, the term of this patent is extended or adjusted under 35 U.S.C. 154(b) by 255 days.

(21) Appl. No.: 15/362,169

(22) Filed: Nov. 28, 2016

(51) Int. Cl.
    *G06F 21/57* (2013.01)

(52) U.S. Cl.
    CPC ...... *G06F 21/577* (2013.01); *G06F 2221/033* (2013.01)

(58) Field of Classification Search
    None
    See application file for complete search history.

(56) References Cited

U.S. PATENT DOCUMENTS

| | | | | |
|---|---|---|---|---|
| 2002/0026591 A1* | 2/2002 | Hartley | ................. | G06Q 30/06 726/25 |
| 2003/0056116 A1* | 3/2003 | Bunker | ................... | H04L 43/00 726/25 |
| 2003/0120935 A1* | 6/2003 | Teal | ....................... | G06F 21/57 713/188 |
| 2009/0271504 A1* | 10/2009 | Ginter | ................ | G05B 23/0213 709/220 |
| 2011/0138470 A1* | 6/2011 | Davis | .................... | G06F 21/564 726/25 |
| 2014/0245376 A1* | 8/2014 | Hibbert | ............... | H04L 63/1433 726/1 |
| 2015/0143502 A1* | 5/2015 | Peterson | ............. | H04L 63/0245 726/11 |
| 2015/0370235 A1* | 12/2015 | Lloyd | .................. | G05B 19/048 700/79 |
| 2016/0044057 A1* | 2/2016 | Chenette | ............ | H04L 63/1433 726/1 |
| 2017/0103211 A1* | 4/2017 | Madou | .................. | G06F 21/577 |

* cited by examiner

*Primary Examiner* — Malcolm Cribbs
(74) *Attorney, Agent, or Firm* — FisherBroyles, LLP

(57) ABSTRACT

The disclosed computer-implemented method for evaluating security software configurations may include (1) identifying, within a software security system, a live configuration that includes active configuration settings applied by the software security system when protecting a computing system, (2) establishing a test configuration that includes at least one configuration setting that is different from the live configuration, (3) recording a live result of the software security system performing a protective action using the live configuration, (4) generating an alternate result of the protective action by performing the protective action using the test configuration instead of the live configuration and without applying changes resulting from the protective action to the computing system, and (5) performing a security action based on the live result of the protective action and the alternate result of the protective action. Various other methods, systems, and computer-readable media are also disclosed.

16 Claims, 7 Drawing Sheets

Software Security System
208

Graphical User Interface
504

| | Live Configuration | Test Configuration |
|---|---|---|
| Scan Sensitivity | 5 | 10 |
| File Exclusions | *.doc, *.txt | none |
| Flagged Files | 3 | 10 |
| Est. False Positives | 0 | 2 |

Interface Element
506

Apply this configuration?

*FIG. 5*

SYSTEMS AND METHODS FOR EVALUATING SECURITY SOFTWARE CONFIGURATIONS

BACKGROUND

Individuals and organizations frequently use various software security systems to protect their computing devices against abnormal and/or unwanted activity. Such software security systems are generally configured with a variety of settings, such as scan sensitivity, portions of a file system to include or exclude from scanning, and various other settings that inform how the software security system behaves. Altering the configuration settings of a software security system may affect the behavior of the software security system in a variety of ways, ranging from time to complete a system scan to the amount of processing resources consumed by protective actions undertaken by the software security system.

Unfortunately, traditional software security systems may have settings that are obscure, opaque, and/or generally difficult to understand by an end user. Furthermore, administrators of software security systems may be unable to easily determine the impact of altering the configuration of a software security system and therefore be unwilling to risk any alterations to the configuration. The instant disclosure, therefore, identifies and addresses a need for systems and methods for evaluating security software configurations.

SUMMARY

As will be described in greater detail below, the instant disclosure describes various systems and methods for evaluating security software configurations. In some examples, a computer-implemented method for evaluating security software configurations may include (i) identifying, within a software security system, a live configuration that includes active configuration settings applied by the software security system when protecting a computing system against abnormal activity, (ii) establishing, for the software security system, a test configuration that includes at least one configuration setting that is different from the live configuration, (iii) recording a live result of the software security system performing, using the live configuration, a protective action that protects the computing system against abnormal activity, (iv) generating an alternate result of the protective action by performing the protective action on the computing system using the test configuration instead of the live configuration and without applying changes resulting from the protective action to the computing system, and (v) performing a security action based on the live result of the protective action and the alternate result of the protective action.

In some embodiments, the security action may include providing the live result of the protective action and the alternate result of the protective action to a backend system that associates the live result and the alternate result with metadata about the computing system in a database. Such a backend system may enable client software security systems to search the database based on metadata about computing systems protected by the software security systems. In these embodiments, the computer-implemented method may include searching, by a client software security system, the database for a suggested configuration for the client software security system based on metadata about the computing system protected by the client software security system. The computer-implemented method may also include providing, by a user interface of the client software security system, a result of the search to an administrator of the client software security system.

In some examples, recording the live result may include recording, while the software security system performs the protective action, (i) a percentage of processor cycles consumed by the software security system, (ii) a percentage of the file system of the computing system scanned by the software security system as part of performing the protective action, (iii) a length of time taken to perform the protective action, (iv) the number of security incidents observed by the software security system, (v) an estimated false positive rate of security incidents of security incidents observed by the software security system, (vi) an estimated false negative rate of security incidents observed by the software security system, and/or (vii) a percentage of input/output operations directed to the computing system that were scanned by the software security system as part of performing the protective action.

The computer-implemented method may include generating the alternate result in a variety of contexts. For example, generating the alternate result may include performing the protective action on the computing system using the test configuration simultaneously with performing the protective action using the live configuration.

In one embodiment, the computing device may include a server that manages configuration settings for software security systems on a group of endpoint devices. In such an embodiment, performing the security action may include configuring each software security system on each endpoint device. In further embodiments, the computing device may include a gateway device that inspects files being passed to an endpoint device by the gateway device. In such embodiments, performing protective action on the endpoint device may include performing the protective action on the files at the gateway device before they are passed to the endpoint device.

In some examples, the computer-implemented method may further include repeating recording the live result and generating the alternate result at a subsequent point in time based on (i) a predetermined period of time elapsing, (ii) a change in the computing system, (iii) the software security system receiving a software update, and/or (iv) a change in the live configuration of the software security system.

In some examples, performing the security action may include causing the software security system to replace the live configuration with the test configuration based on a comparison of the live result and the alternate result. Additionally or alternatively, performing the security action may include providing a result of a comparison between the live result and the alternate result to an administrator of the software security system via a graphical user interface.

In one embodiment, the configuration settings used by the software security system may include a scan sensitivity setting that describes a ruleset used by the software security system as part of determining whether a file or link is malicious.

A system for implementing the above-described method may include (i) an identification module, stored in memory, that identifies, within a software security system, a live configuration including active configuration settings applied by the software security system when protecting a computing system against abnormal activity, (ii) an establishing module, stored in memory, that establishes, for the software security system, a test configuration including at least one configuration setting that is different from the live configuration, (iii) a recording module, stored in memory, that records a live result of the software security system performing, using the live configuration, a protective action that protects the computing system against abnormal activity, (iv) a generation module, stored in memory, that generates an alternate result of the protective action by performing the protective action on the computing system using the test configuration instead of the live configuration and without applying changes resulting from the protective action to the computing system, (v) a security module, stored in memory, that performs a security action based on the live result of the protective action and the alternate result of the protective action, and (vi) at least one physical processor configured to execute the identification module, the establishing module, the recording module, the generation module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify, within a software security system, a live configuration including active configuration settings applied by the software security system when protecting a computing system against abnormal activity, (ii) establish, for the software security system, a test configuration including at least one configuration setting that is different from the live configuration, (iii) record a live result of the software security system performing, using the live configuration, a protective action that protects the computing system against abnormal activity, (iv) generate an alternate result of the protective action by performing the protective action on the computing system using the test configuration instead of the live configuration and without applying changes resulting from the protective action to the computing system, and (v) perform a security action based on the live result of the protective action and the alternate result of the protective action.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 5 is a block diagram of an example graphical user interface displaying the results of a comparison between two software security system configurations.

Figure 1:
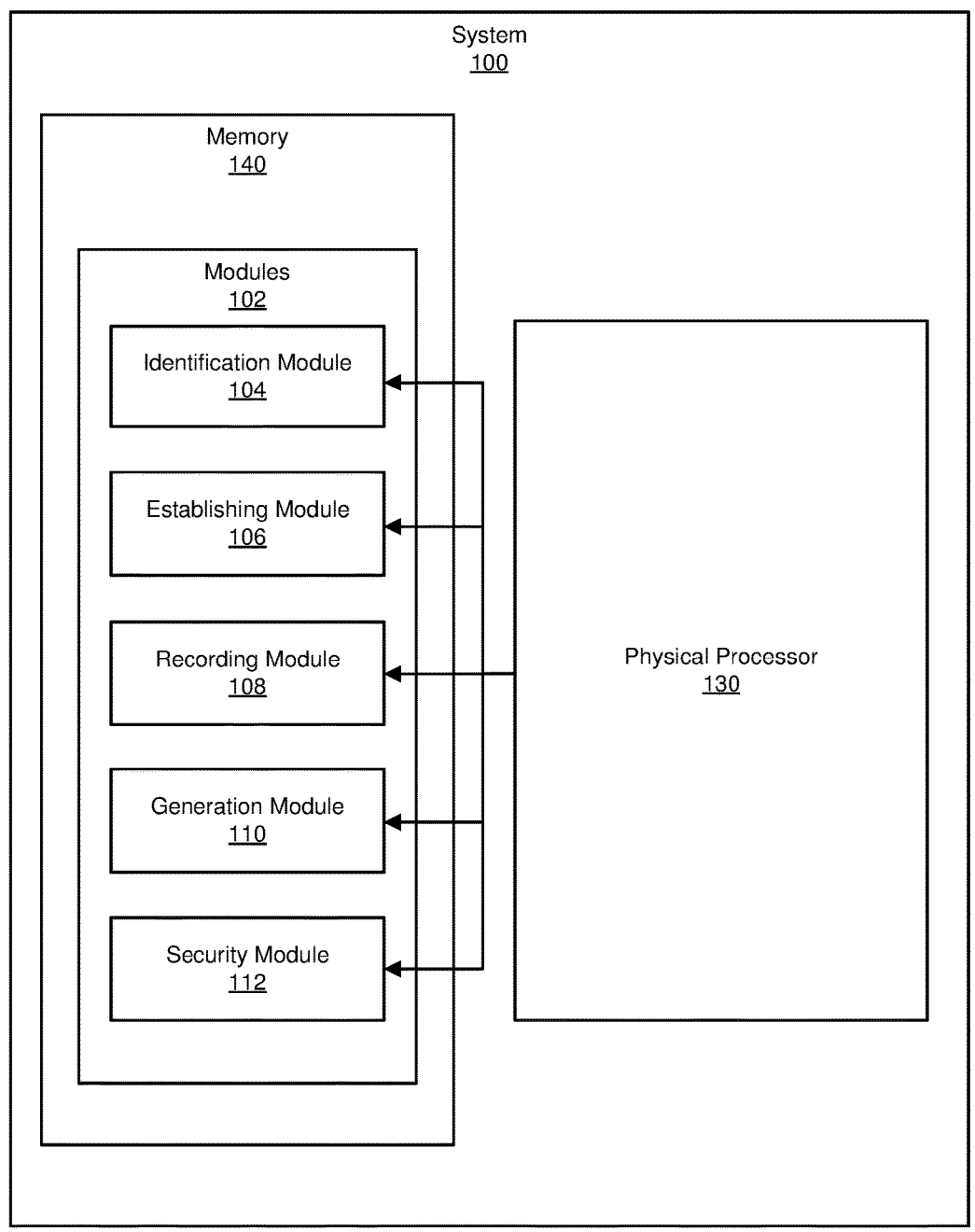
FIG. 1 is a block diagram of an example system for evaluating security software configurations.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for evaluating security software configurations. As will be described in greater detail below, the systems and methods described herein may record actions undertaken by a software security system and compare the results of those actions to the results that would have occurred had the software security system performed the actions under a test configuration. The disclosed systems and methods may then provide administrators of software security systems with a comparison report that describes the difference in behavior of the software security system under the live configuration versus the test configuration. Providing this comparison may inform administrators of changes in the behavior of the software security system specifically as it would impact the actual computing system protected by the software security system rather than relying on projections or estimates derived from testing the test configuration in an isolated environment that may not accurately depict the behavior of the software security system on a live computing system.

Furthermore, the systems and methods described herein may provide a clear advantage over traditional methods that rely on testing configurations in a sandbox or other restricted testing environment. Such traditional testing environments may be unable to fully emulate large and/or complex computing systems, such as those used by international organizations. By testing a security configuration on the live computing system rather than in an isolated testing environment, the systems and methods described herein may enable administrators to obtain an accurate portrait of how security system behavior is likely to change should the test settings be applied as live settings.

Figure 2:
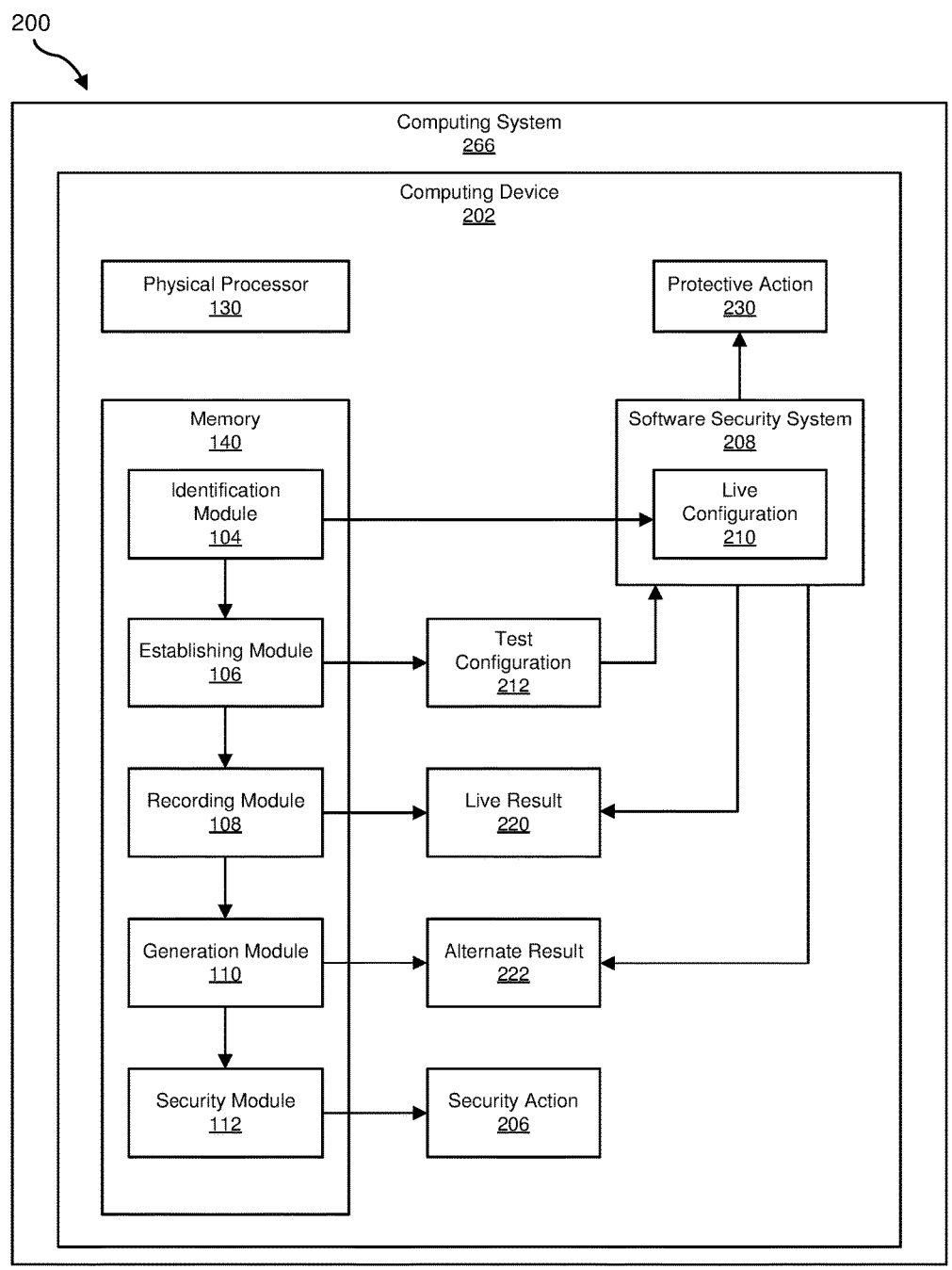
FIG. 2 is a block diagram of an additional example system for evaluating security software configurations.

The following will provide, with reference to FIGS. 1-2, detailed descriptions of example systems for evaluating security software configurations. Detailed descriptions of corresponding computer-implemented methods will also be provided in connection with FIG. 3. Detailed descriptions of example systems for evaluating security software configurations using a backend system will be provided in connection with FIG. 4, and detailed descriptions of an example user interface will be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for evaluating security software configurations. As illustrated in this figure, system 100 may include one or more modules 102 for performing one or more tasks. For example, and as will be explained in greater detail below, system 100 may include an identification module 104 that identifies, within a software security system, a live configuration that includes active configuration settings applied by the software security system when protecting a computing system against abnormal activity. System 100 may additionally include an establishing module 106 that establishes, for the software security system, a test configuration that includes at least one configuration setting that is different from the live configuration. System 100 may also include a recording module 108 that records a live result of the software security system performing, using the live configuration, a protective action that protects the computing system against abnormal activity. Furthermore, system 100 may include a generation module 110 that generates an alternate result of the protective action by performing the protective action on the computing system using the test configuration instead of the live configuration and without applying changes resulting from the protective action to the computing system. System 100 may also include a security module 112 that performs a security action based on the live result of the protective action and the alternate result of the protective action. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate evaluating security software configurations. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication and/or incorporated as part of a computing system 266. In one example, all or a portion of the functionality of modules 102 may be performed by computing device 202 and/or any other suitable computing system. As will be described in greater detail below, one or more of modules 102 from FIG. 1 may, when executed by at least one processor of computing device 202 and/or other computing system, enable computing device 202 to generate comparisons between various security system configurations based on how they might affect a live computing system. For example, and as will be described in greater detail below, identification module 104 may identify, within a software security system 208, a live configuration 210 comprising active configuration settings applied by software security system 208 when protecting a computing system 266 against abnormal activity. Establishing module 106 may establish, for software security system 208, a test configuration 212 comprising at least one configuration setting that is different from live configuration 210. Recording module 108 may record a live result 220 of software security system 208 performing, using live configuration 210, a protective action 230 that protects computing system 266 against abnormal activity. Generation module 110 may generate an alternate result 222 of the protective action by performing protective action 230 on computing system 266 using test configuration 212 instead of live configuration 210 and without applying changes resulting from protective action 230 to computing system 266. Security module 112 may perform a security action 206 based on live result 220 of the protective action and alternate result 222 of protective action 230.

Computing device 202 generally represents any type or form of computing device capable of reading computer-executable instructions. For example, computing device 202 may represent a personal computer running a computer security software suite that provides malware detection services. In some embodiments, computing device 202 may represent a gateway device that pushes security software configuration settings to endpoint devices running software security systems linked to software installed on the gateway device. In some embodiments, computing device 202 may represent a server that manages configuration settings for software security systems on a plurality of endpoint devices. Additionally or alternatively, computing device 202 may represent a gateway device that inspects files being passed to an endpoint device via the gateway device. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device. Various computing devices, including computing device 202, may be used alone or in combination (e.g., linked via a network) to form a computing system (e.g., computing system 266 in FIG. 2).

Software security system 208 generally represents any type or form of software configured to protect a computing system against unwanted files, executable code, access, activity, or any other undesirable behavior. Examples of software security system 208 include, without limitation, antivirus software, firewalls, access control systems, intrusion detection systems, anti-tamper software, combinations of one or more of the same, or any other suitable application for protecting a computing system against abnormal activity. Such systems may perform a variety of protective actions, such as monitoring a network connection, scanning all or a portion of a file system, tracking user actions, combinations of one or more of the same, or any other suitable action that protects a computing system against abnormal activity. Software security systems may change their behavior based on how they are configured.

Software security system 208 may perform protective actions in a variety of contexts. For example, in embodiments where computing device 202 includes a server that manages configuration settings for software security systems on endpoint devices, software security system 208 may provide configuration files to and/or configure the software security systems on the endpoint devices. In embodiments where computing device 202 includes a gateway device that inspects files being passed to endpoint devices through the gateway device, software security software system 208 may perform protective actions (e.g., scanning the files) at the gateway device before passing the files to the relevant endpoint device.

Live configuration 210 and test configuration 212 generally represent particular arrangements of settings and/or configurations for software security system 208. Live configuration 210 represents the configuration that is actively used by software security system 208 when performing protective actions on a computing system (e.g., computing system 266) and informs any changes made to the computing system. Test configuration 212 generally represents a configuration that is being evaluated, as will be described in greater detail below. These configurations may contain a variety of settings. For example, the configuration settings used by software security system 208 may include a scan sensitivity setting that describes a ruleset used by the software security system as part of determining whether a file or link is malicious.

Figure 3:
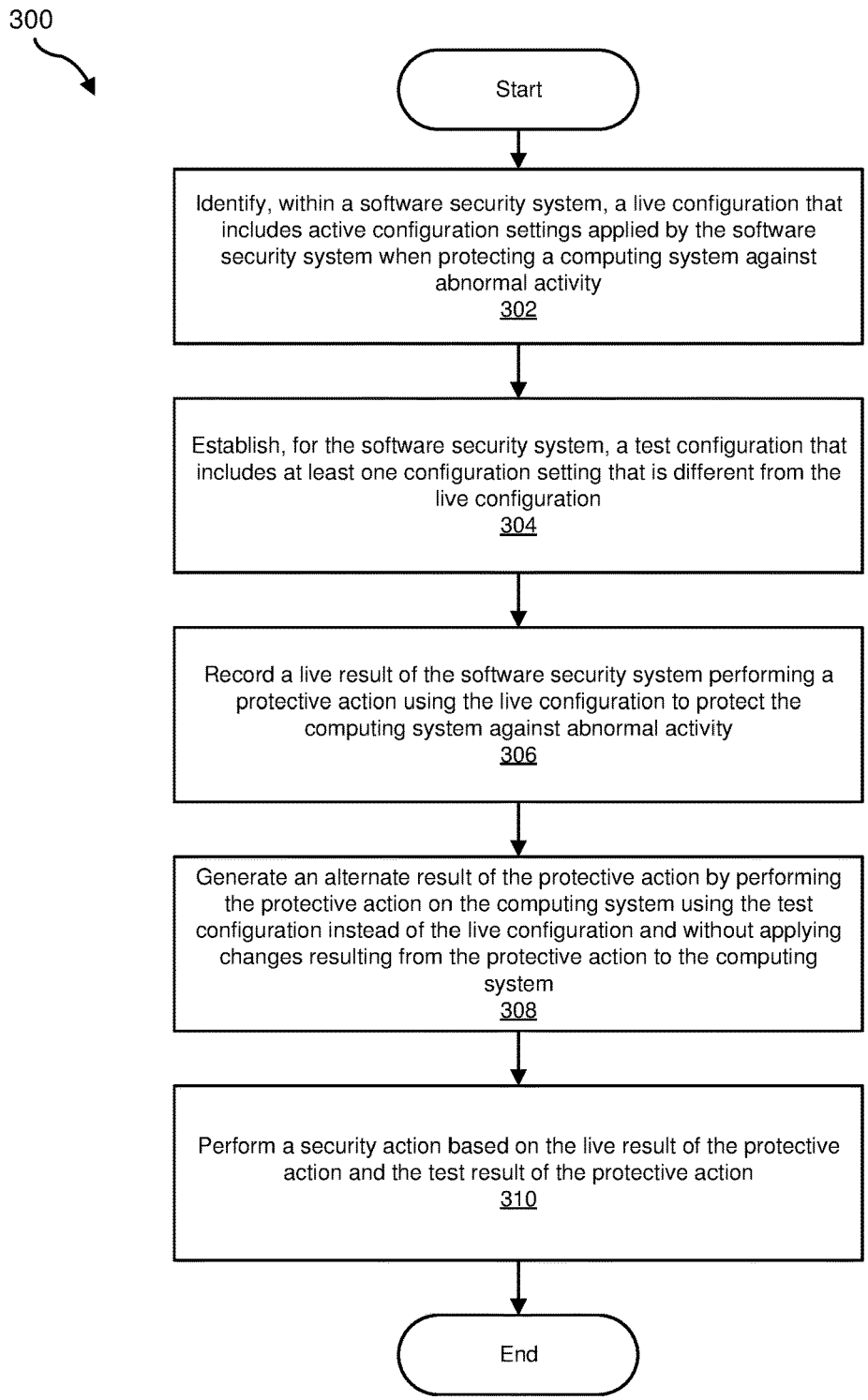
FIG. 3 is a flow diagram of an example method for evaluating security software configurations.

FIG. 3 is a flow diagram of an example computer-implemented method 300 for evaluating security software configurations. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify, within a software security system, a live configuration including active configuration settings applied by the software security system when protecting a computing system against abnormal activity. For example, identification module 104 may, as part of computing device 202 in FIG. 2, identify, within software security system 208, live configuration 210. Live configuration 210 may include active configuration settings that are applied by software security system 208 when performing protective action 230 in order to protect computing system 266 against abnormal activity.

Identification module 104 identify live configuration 210 in a variety of contexts. In some embodiments, identification module 104 may be integrated as part of software security system 208 and recognize the active configuration settings used by software security system 208. Additionally or alternatively identification module 104 may execute as part of a monitor program external to software security system 208 that observes functions carried out by software security system 208.

Furthermore, identification module 104 may identify live configuration 210 in a variety of ways. In some embodiments, software security system 208 may store configuration files in a known or otherwise previously established location. In these embodiments, identification module 104 may identify information in those files as live configuration 210. Additionally or alternatively, identification module 104 may prompt an administrator or other user of software security system 208 to provide the location of a live configuration file for software security system 208. Identification module 104 may generate a graphical user interface prompt, such as a pop-up window, as part of prompting the user to provide the location of the live configuration file. In some examples, identification module 104 may query software security system 208 to identify live configuration 210. For example, identification module 104 may request access to the configuration settings of software security system 208 through an application program interface (API) of software security system 208.

At step 304 in FIG. 3, one or more of the systems described herein may establish, for the software security system, a test configuration that includes at least one configuration setting that is different from the live configuration. For example, establishing module 106 may, as part of computing device 202 in FIG. 2, establish test configuration 212 for software security system 208. Test configuration 212 may include at least one configuration setting that is different from live configuration 210.

Establishing module 106 may generate test configuration 212 in a variety of ways. In some embodiments, establishing module 106 may make an incremental modification to live configuration 210 and use the modified result as test configuration 212. For example, live configuration 210 may contain a setting for scan sensitivity set at sensitivity level 5. In this example, establishing module 106 may use scan sensitivity level 6 as part of test configuration 212. Additionally or alternatively, establishing module 106 may receive test configuration 210 from a user or administrator of software security system 208. For example, an administrator may wish to test a potential configuration update for software security system 208 before pushing the updated configuration to a variety of endpoint devices. In this example, establishing module 106 may prompt the administrator to provide a test configuration by manually entering configuration settings and/or by directing establishing module 106 to a file containing the configuration settings to be used as test configuration 212.

In some embodiments, establishing module 106 may receive test configuration 212 from a backend security system. For example, establishing module 106 may search a database of software security system configurations hosted by the backend security system for suggested configurations of the client software security system. As will be described in greater detail below, various software security systems (including software security system 208) protecting different computing systems may provide configurations to the database as part of a crowd-sourced security effort. For example, a security vendor that publishes software security system 208 may additionally maintain a backend database of security system configurations, and various instances of software security system 208 may be programmed to periodically provide information about their configuration to the database.

Establishing module 106 may search this database based on metadata about computing system 266 and provide the results of the search to an administrator of software security system 208 through a user interface of software security system 208. As a specific example, software security system 208 may protect a personal computer running the MICRO- SOFT WINDOWS 10 operating system with an INTEL CORE i5 processor and 8 gigabytes of RAM. Establishing module 106 may search the database of software security system configurations for configurations used by other software security systems that protect personal computers with similar specifications. As an additional specific example, software security system 208 may protect a corporate network composed of 50 workstations that are physically located within the same building and execute the MICROSOFT OFFICE suite of software. Establishing module 106 may search the database of software security configurations for configurations used by software security systems that operate in similar environments. Establishing module 106 may then provide the results of this search to an administrator of software security system 208 through, for example, a graphical user interface of software security system 208. Establishing module 106 may then allow the administrator to select one or more configurations for testing and/or inform the administrator that one or more configurations are queued for testing.

Figure 4:
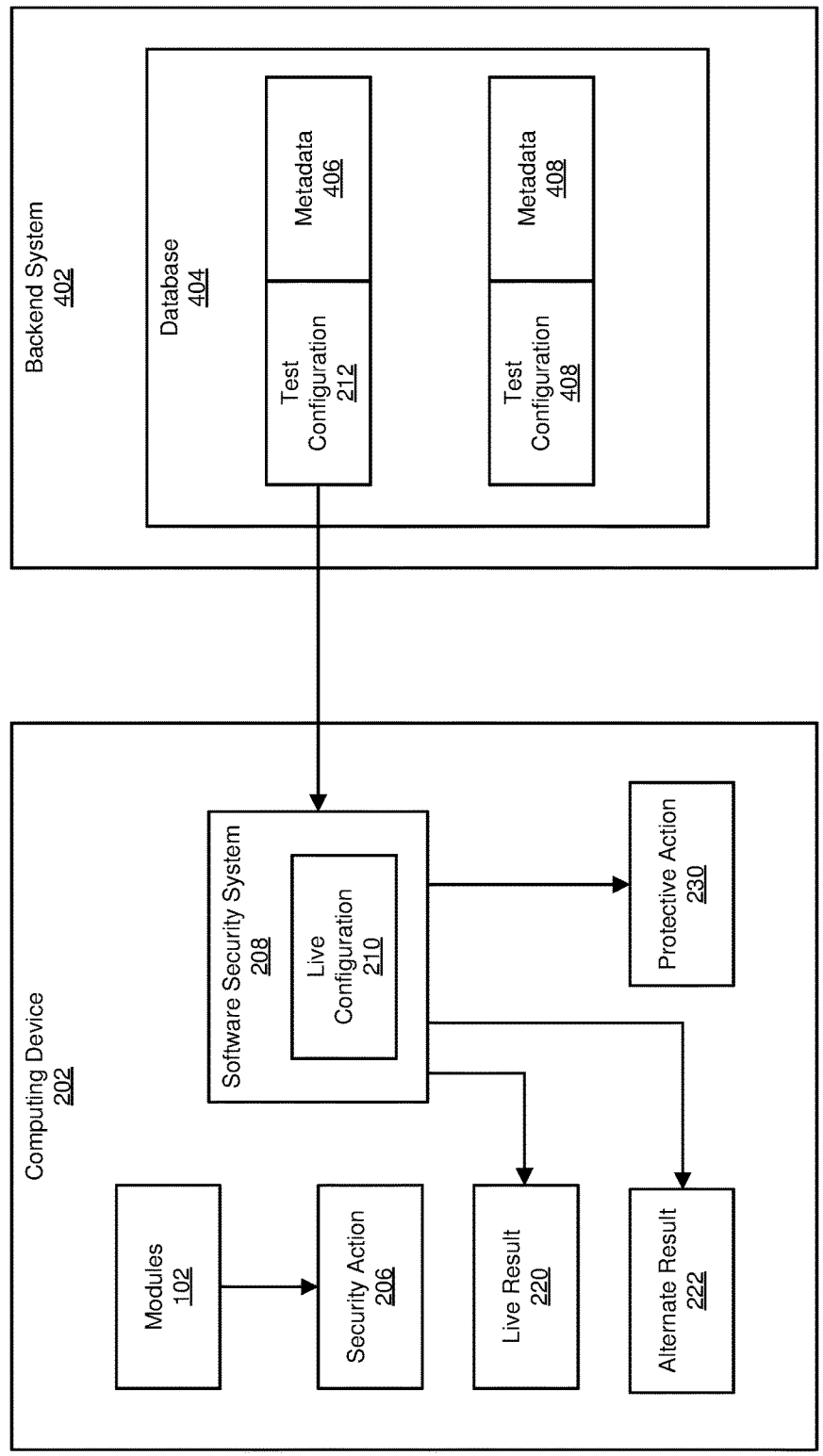
FIG. 4 is a block diagram of an example computing system for evaluating security software configurations using a backend system.

An illustrated example of the above-described embodiment is provided in connection with FIG. 4. As shown in FIG. 4, establishing module 106 may, as part of modules 102, search a database 404 hosted by a backend system 402 for an appropriate test configuration for software security system 208. Computing device 202 and backend system 402 may be connected by a network, such as the Internet and/or a local area network. Establishing module 106 may use metadata of computing device 202, metadata of computing system 266 (not illustrated in FIG. 4), metadata of software security system 208, combinations of one or more of the same, and/or any other suitable metadata as part of this search. Establishing module 106 may compare this metadata to metadata associated with various test configurations stored in database 404, and select an appropriate test configuration based on the comparison. Specifically, establishing module 106 may determine that metadata 406 represents a sufficiently similar match to the metadata of computing device 202, and therefore select test configuration 212 as a potential candidate for generating alternate result 222. However, establishing module 106 may determine that metadata 408 represents a computing system that is sufficiently different from computing device 202, and therefore reject test configuration 408 as a potential candidate for local testing.

At step 306 in FIG. 3, one or more of the systems described herein may record a live result of the software security system performing a protective action that protects the computing system against abnormal activity using the live configuration. For example, recording module 108 may, as part of computing device 202 in FIG. 2, record live result 220 of software security system 208 performing protective action 230 using live configuration 210.

Recording module 108 may record a variety of information as part of recording live result 220. For example, recording module 108 may record live result 220 by recording, while software security system 208 performs protective action 230, a percentage of processor cycles consumed by software security system 208, a percentage of the file system of the computing system scanned by software security system 208 as part of performing protective action 230, a length of time taken to perform protective action 230, the number of security incidents observed by software security system 208, an estimated false positive rate of security incidents of security incidents observed by software security system 208, an estimated false positive and/or false negative rate of security incidents observed by software security system 208, and/or a percentage of input/output operations directed to the computing system that were scanned by software security system 208 as part of performing protective action 230.

Furthermore, recording module 108 may record live result 220 in a variety of ways. In some embodiments, recording module 108 may receive real-time information from software security system 208 and/or an operating system of computing device 202 and/or computing system 266. For example, recording module 108 may receive a signal from software security system 208 whenever software security system 208 identifies a malicious file during a system scan and increment a counter for the number of malicious files detected during the system scan. Similarly, recording module 108 may track computing resource consumption through an operating system API while software security system 208 executes protective action 230. Additionally or alternatively, recording module 108 may receive an action report summary from software security system 208 and/or the above-identified operating system. For example, software security system 208 may provide a report to recording module 108 indicating that software security system 208 identified 10 malicious files during a system scan that excluded system files and took 2 hours to complete. Software security system 208 may resolve results of protective action 230 as normal. For example, an anti-virus system scanning a file may determine that the file is malicious and quarantine the file.

Returning to FIG. 3 at step 308, one or more of the systems described herein may generate an alternate result of the protective action by performing the protective action on the computing system using the test configuration instead of the live configuration and without applying changes resulting from the protective action to the computing system; an. For example, generation module 110 may, as part of computing device 202 in FIG. 2, generate alternate result 222 by performing protective action 230 on computing device 202 using test configuration 212 instead of live configuration 210 and without applying changes resulting from protective action 230 to computing device 202.

Software security system 208 may perform protective action 230 using test configuration 212 in a variety of ways. In some embodiments, software security system 208 may perform protective action 230 using test configuration 212 during downtime or low-workload times, such as late at night when few or no users are expected to be using computing system 266. Additionally or alternatively, software security system 208 may perform protective action 230 using test configuration 212 simultaneously with performing protective action 230 using live configuration 210. In these examples, software security system 208 may, for example, scan a file using test configuration 212 and recording the result, but not apply any changes necessitated by the scan. In other words, software security system 208 may perform protective action 230 using test configuration 212 in the same way that software security system 208 would perform protective action 230, except refrain from resolving protective action 230 in a way that would modify computing system 266. As a specific example, an anti-virus system performing protective action 230 using test configuration 212 may scan a file and determine that the file is malicious, but refrain from quarantining or deleting the file.

Furthermore, software security system may perform protective action 230 using test configuration 212 on the live computing system rather than in a sandbox or other restricted testing environment. In other words, generation module 110 may generate alternate result 222 such that alternate result 222 represents an accurate scenario of what is likely to occur when performing protective action 230 using test configuration 212 on the specific computing system protected by software security system 208. This "what-if" scenario may therefore provide results specific to the computing system rather than more generalized results that are not specifically tailored to any particular computing system.

Generation module 110 may generate alternate result 222 in a fashion similar to recording live result 220, as described above. For example, generation module 110 may record computing resources consumed by software security system 208 while software security system 208 performs the "ghost" version of protective action 230. Additionally or alternatively, generation module 110 may receive information from software security system 208 describing the results of applying test configuration 212 to perform protective action 230 while refraining from actually applying changes resulting from performing protective action 230 using test configuration 212 to computing system 266.

At step 310, one or more of the systems described herein may perform a security action based on the live result of the protective action and the alternate result of the protective action. For example, security module 112 may, as part of computing device 202 in FIG. 2, perform security action 206 based on live result 220 of the protective action and alternate result 222 of protective action 230.

Security module 112 may perform a variety of tasks as part of performing security action 206. In some embodiments, the security action may include providing the live result of the protective action and the alternate result of the protective action to a backend system that associates the live result and the alternate result with metadata about the computing system in a database and enables client software security systems to search the database based on metadata about computing systems protected by the software security systems.

As an illustrated example and with returning reference to FIG. 4, security module 112 may provide live configuration 210 to backend system 402 along with live result 220 and metadata about computing device 202, computing system 266 and/or software security system 208. Similarly, security module 112 may provide test configuration 212 to backend system along with alternate result 222 and metadata about computing device 202, computing system 266, and/or software security system 208. As described in greater detail above, other instances of modules 102 executing on other computing systems may search database 404 based on the provided information to identify potential test configurations. In other words, the systems and methods described herein may enable computing systems to optimize the configurations of their software security systems based on configuration testing carried out by other computing systems.

In some examples, security module 112 may perform the security action by providing a result of a comparison between live result 220 and alternate result 222 to an administrator of software security system 208 via a graphical user interface. For example, security module 112 may display a table with a column representing the results of protective action 230 when using live configuration 210 and a second column representing the results of protective action 230 when using test configuration 212. Security module 112 may add additional columns representing other test configurations and/or results derived from test configurations tested by computing systems similar to computing system 266. The table may also include rows representing the various settings included in each configuration and/or various system metrics that were measured during the execution of protective action 230. For example, the table may include rows for the time taken to complete protective action 230, the scan sensitivity used, and the number of malicious files detected by the scan. In other examples, configurations of software security system 208 may be represented as rows while settings and/or system metrics are represented in columns.

An illustrated example of such a table is provided in FIG. 5. As shown in FIG. 5, security module 112 may cause software security system 208 to display a comparison between live configuration 210 and test configuration 212. In the example of FIG. 5, each configuration is represented by a column, and details about each configuration are represented in rows. Specifically, live configuration 210 used a scan sensitivity of 5 while test configuration 212 used a scan sensitivity of 10. Live configuration 210 excluded files with a *.doc or *.txt file extension from the scan, while the test configuration did not exclude any files. Live configuration 210 flagged 3 files as potentially malicious, while test configuration 212 identified 10 files as potentially malicious. Furthermore, using live configuration 210 caused software security system 208 to flag 3 files as malicious with an estimation of no false positives, while using test configuration 212 flagged 10 files as malicious with an estimation of 2 false positives. Graphical user interface 504 may additionally incorporate an interface element 506 that allows an administrator to prompt security module 112 to replace live configuration 210 with test configuration 212, as will be described in greater detail below.

In some embodiments, security module 112 may perform security action 206 by causing software security system 208 to replace live configuration 210 with the test configuration 212 based on a comparison of the live result and the alternate result. For example, the above-described graphical user interface may include a button that, when clicked by a user, will overwrite live configuration 210 with the settings in test configuration 212. In embodiments where multiple test configurations are presented for administrator review, the system administrator may be able to select a configuration (including live configuration 210) to apply as live configuration 210 in future executions of protective action 230.

Computing systems may change over time, causing live configuration 210 to no longer be the optimal configuration for software security system 208. The systems and methods described herein may accordingly test or re-test various configurations in the manner described above in response to a variety of factors. For example, the systems and methods described herein may repeat recording the live result and generating the alternate result at a subsequent point in time based on a predetermined period of time elapsing, detecting a change in the computing system, the software security system receiving a software update, and/or a change in the live configuration of the software security system. Security module 112 may then provide the results of this repeated analysis to an administrator of software security system 208, as described in greater detail above, and potentially enable overwriting live configuration 210 with the settings in test configuration 212.

As described in greater detail above in connection with method 300 in FIG. 3, a software security system may periodically test sample configurations on a live computing system and compare the results of the test to the results produced by running the software security system using the established live configuration. The software security system may then present the results of this analysis to a system administrator, thus allowing the administrator to make an informed decision regarding appropriate configuration settings for the software security system.

Furthermore, the software security system may participate in crowd-sourced efforts to optimize its configuration. For example, the software security system may report its live configuration to a backend system that stores configurations in association with metadata about the system that generated the configuration. The software security system may also receive sample configurations from this backend server based on the metadata associated with the sample configuration matching metadata about the computing system protected by the software computing system. Such crowd-sourced security may expedite the process of finding an optimized configuration for the software security system.

Figure 6:
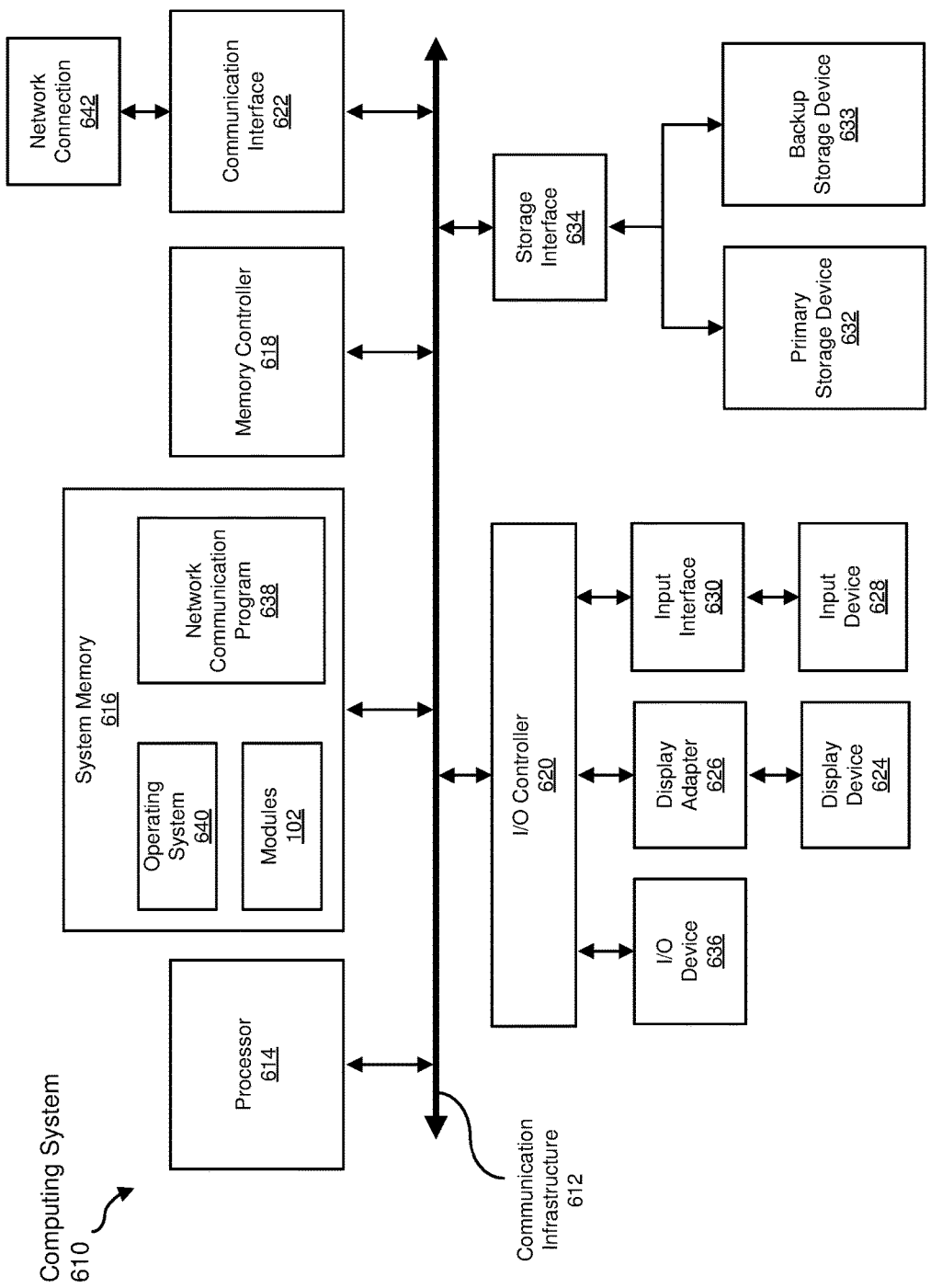
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
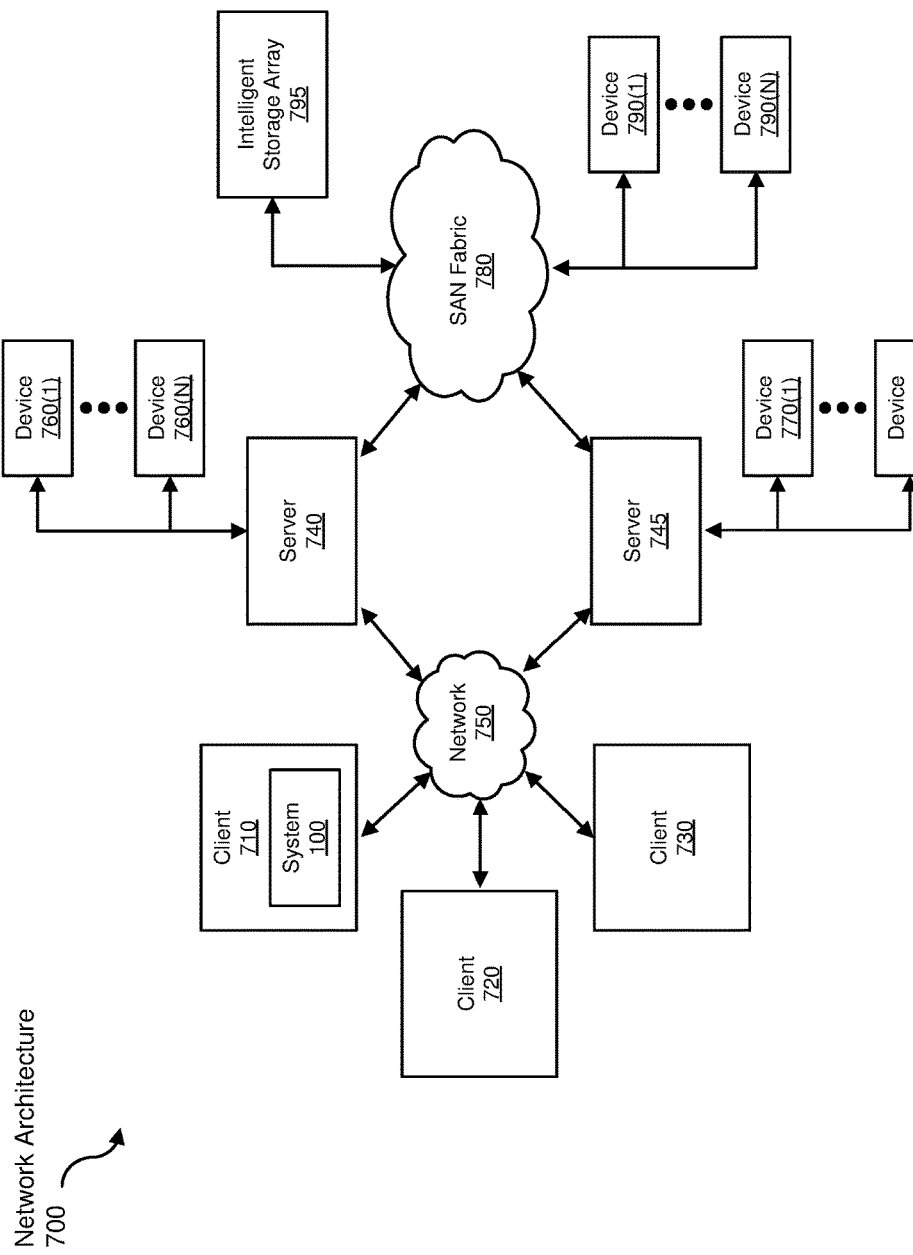
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for evaluating security software configurations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or another remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive configuration information from a software security system, generate an alternate configuration based on the received configuration, record the results of the software security system applying each configuration, transform the results into a report that describes differences in the behavior of the software security system under each behavior, output a result of the report to a graphical user interface, store a result of the report to a database, use a result of the report to update configuration settings on one or more software security systems, and/or provide information contained in the report to an administrator or other end user of the software security system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for evaluating security software configurations, at least a portion of the method being performed by a computing device comprising at least one processor, the method comprising:
   identifying, within a software security system, a live configuration comprising active configuration settings applied by the software security system when protecting a computing system against abnormal activity;
   establishing, for the software security system, a test configuration comprising at least one configuration setting that is different from the live configuration;
   recording a live result of the software security system performing, using the live configuration, a protective action that protects the computing system against abnormal activity;
   generating an alternate result of the protective action by performing the protective action on the computing system using the test configuration instead of the live configuration and without applying changes resulting from the protective action to the computing system; and performing a security action based on the live result of the protective action and the alternate result of the protective action, wherein performing the security action comprises providing the live result of the protective action and the alternate result of the protective action to a backend system that:

associates the live result and the alternate result with metadata about the computing system in a database;

enables client software security systems to search the database based on metadata about computing systems protected by the software security systems to find a suggested configuration for the client software security system; and provides, by a user interface of the client software security system, a result of the search to an administrator of the client software security system.

2. The method of claim 1, wherein recording the live result comprises recording, while the software security system performs the protective action, at least one of:

a percentage of processor cycles consumed by the software security system;

a percentage of a file system of the computing system scanned by the software security system as part of performing the protective action;

a length of time taken to perform the protective action;

a number of security incidents observed by the software security system;

an estimated false positive rate of security incidents of security incidents observed by the software security system;

an estimated false negative rate of security incidents observed by the software security system; and a percentage of input/output operations directed to the computing system that were scanned by the software security system as part of performing the protective action.

3. The method of claim 1, wherein generating the alternate result comprises performing the protective action on the computing system using the test configuration simultaneously with performing the protective action using the live configuration.

4. The method of claim 1, wherein:

the computing device comprises a server that manages configuration settings for software security systems on a plurality of endpoint devices; and performing the security action further comprises configuring each software security system on each endpoint device.

5. The method of claim 1, wherein:

the computing device comprises a network gateway device that inspects digital files being passed to an endpoint device by the network gateway device; and performing protective action on the endpoint device comprises performing the protective action on the digital files at the network gateway device before the digital files are passed to the endpoint device.

6. The method of claim 1, further comprising repeating recording the live result and generating the alternate result at a subsequent point in time based on at least one of:

a predetermined period of time elapsing;

a change in the computing system;

the software security system receiving a software update; and a change in the live configuration of the software security system.

7. The method of claim 1, wherein performing the security action further comprises causing the software security system to replace the live configuration with the test configuration based on a comparison of the live result and the alternate result.

8. The method of claim 1, wherein the configuration settings used by the software security system comprise a scan sensitivity setting that describes a ruleset used by the software security system as part of determining whether a file or link is malicious.

9. The method of claim 1, wherein performing the security action further comprises providing a result of a comparison between the live result and the alternate result to an administrator of the software security system via a graphical user interface.

10. A system for evaluating security software configurations, the system comprising:

an identification module, stored in memory, that identifies, within a software security system, a live configuration comprising active configuration settings applied by the software security system when protecting a computing system against abnormal activity;

an establishing module, stored in memory, that establishes, for the software security system, a test configuration comprising at least one configuration setting that is different from the live configuration;

a recording module, stored in memory, that records a live result of the software security system performing, using the live configuration, a protective action that protects the computing system against abnormal activity;

a generation module, stored in memory, that generates an alternate result of the protective action by performing the protective action on the computing system using the test configuration instead of the live configuration and without applying changes resulting from the protective action to the computing system;

a security module, stored in memory, that performs a security action based on the live result of the protective action and the alternate result of the protective action, wherein performing the security action comprises providing the live result of the protective action and the alternate result of the protective action to a backend system that:

associates the live result and the alternate result with metadata about the computing system in a database;

enables client software security systems to search the database based on metadata about computing systems protected by the software security systems to find a suggested configuration for the client software security system; and provides, by a user interface of the client software security system, a result of the search to an administrator of the client software security system; and at least one physical processor configured to execute the identification module, the establishing module, the recording module, the generation module, and the security module.

11. The system of claim 10, wherein the recording module records a live result at least in part by recording, while the software security system performs the protective action, at least one of:

a percentage of processor cycles consumed by the software security system;

a percentage of the file system of the computing system scanned by the software security system as part of performing the protective action;

a length of time taken to perform the protective action;

the number of security incidents observed by the software security system;

an estimated false positive rate of security incidents of security incidents observed by the software security system;

an estimated false negative rate of security incidents observed by the software security system; and a percentage of input/output operations directed to the computing system that were scanned by the software security system as part of performing the protective action.

12. The system of claim 10, wherein the generation module generates the alternate result by performing the protective action on the computing system using the test configuration simultaneously with performing the protective action using the live configuration.

13. The system of claim 10:

further comprising a server that manages configuration settings for software security systems on a plurality of endpoint devices; and wherein the security module performs the security action at least in part by configuring each software security system on each endpoint device.

14. The system of claim 10:

further comprising a network gateway device, comprising a gateway memory, that inspects digital files being passed to an endpoint device by the network gateway device; and wherein the software security system performs the protective action on the endpoint device by performing the protective action on the digital files at the network gateway device before the digital files are passed to the endpoint device.

15. The system of claim 10, the recording module repeats recording the live result and the generation module repeats generating the alternate result at a subsequent point in time based on at least one of:

a predetermined period of time elapsing;

a change in the computing system;

the software security system receiving a software update; and a change in the live configuration of the software security system.

16. A non-transitory computer-readable medium comprising one or more computer-readable instructions that, when executed by at least one processor of a computing device, cause the computing device to:

identify, within a software security system, a live configuration comprising active configuration settings applied by the software security system when protecting a computing system against abnormal activity;

establish, for the software security system, a test configuration comprising at least one configuration setting that is different from the live configuration;

record a live result of the software security system performing, using the live configuration, a protective action that protects the computing system against abnormal activity;

generate an alternate result of the protective action by performing the protective action on the computing system using the test configuration instead of the live configuration and without applying changes resulting from the protective action to the computing system; and perform a security action based on the live result of the protective action and the alternate result of the protective action, wherein performing the security action comprises providing the live result of the protective action and the alternate result of the protective action to a backend system that:

associates the live result and the alternate result with metadata about the computing system in a database;

enables client software security systems to search the database based on metadata about computing systems protected by the software security systems to find a suggested configuration for the client software security system; and provides, by a user interface of the client software security system, a result of the search to an administrator of the client software security system.

* * * * *